United States Patent [19]

Pollinger et al.

[11] Patent Number: 4,535,874

[45] Date of Patent: Aug. 20, 1985

[54] CARRIER FOR BRAKE LININGS FOR DISK BRAKES HAVING DIVIDED LINING ELEMENTS

[75] Inventors: Hans Pollinger, Munich; Eckart Saumweber, Gauting; Mathias Schörwerth, Geretsried; Xaver Wirth, Ismaning, all of Fed. Rep. of Germany

[73] Assignee: Knorr-Bremse GmbH, Munich, Fed. Rep. of Germany

[21] Appl. No.: 520,628

[22] Filed: Aug. 5, 1983

[30] Foreign Application Priority Data

Aug. 23, 1982 [DE] Fed. Rep. of Germany ....... 3231279

[51] Int. Cl.³ ............................................. F16D 69/04
[52] U.S. Cl. .................................... 188/73.1; 188/217; 188/242; 188/250 G
[58] Field of Search ................... 188/73.1, 73.2, 73.31, 188/73.32, 73.37, 73.38, 71.6, 250 B, 250 G, 250 R, 250 F, 234, 238, 242, 244, 245, 264 R, 264 A, 264 AA, 71.1, 217, 246, 251 R, 252, 253; 192/107 C

[56] References Cited

U.S. PATENT DOCUMENTS

| | | | |
|---|---|---|---|
| 2,904,138 | 9/1959 | Wilson | 188/242 X |
| 3,759,354 | 9/1973 | Dowell et al. | 188/73.2 X |
| 3,895,693 | 7/1975 | Lucien et al. | 188/73.2 X |
| 3,923,128 | 12/1975 | Lucien et al. | 188/251 A |
| 4,090,591 | 5/1978 | Pollinger et al. | 188/73.1 |

FOREIGN PATENT DOCUMENTS

| | | | |
|---|---|---|---|
| 2446962 | 8/1930 | France | 188/245 |
| 1101354 | 10/1955 | France | 188/250 F |
| 1351714 | 12/1963 | France | 188/250 F |
| 1404354 | 8/1975 | United Kingdom | 192/107 C |

Primary Examiner—Bruce H. Stoner, Jr.
Assistant Examiner—Michael P. Gilday

[57] ABSTRACT

A brake lining carrier has a base plate one side of which can be detachably mounted on a brake lining support member and on the other side thereof is a layer of resilient material upon which are positioned a plurality of brake lining elements disposed to define a friction braking surface. A frame is provided on the edge portion of the base plate to enclose the brake lining elements. Each brake lining element is mounted upon a carrier plate which has projecting flange portions on two longitudinal sides of the brake lining element. The flange portions on the outer longitudinal sides are received within a groove formed in the frame and the flange portions on the inner longitudinal side extend into an open central portion of the friction lining block in which there is a clamp exerting a force against the inner flange portions in a direction perpendicular to the friction surface. The brake lining elements are so mounted so as to have a lateral play parallel to the friction braking surface and in the direction of friction force occurring on the friction surface during braking, the brake lining elements can be positioned against each other and can be supported jointly against the frame while mutually supporting each other.

10 Claims, 13 Drawing Figures

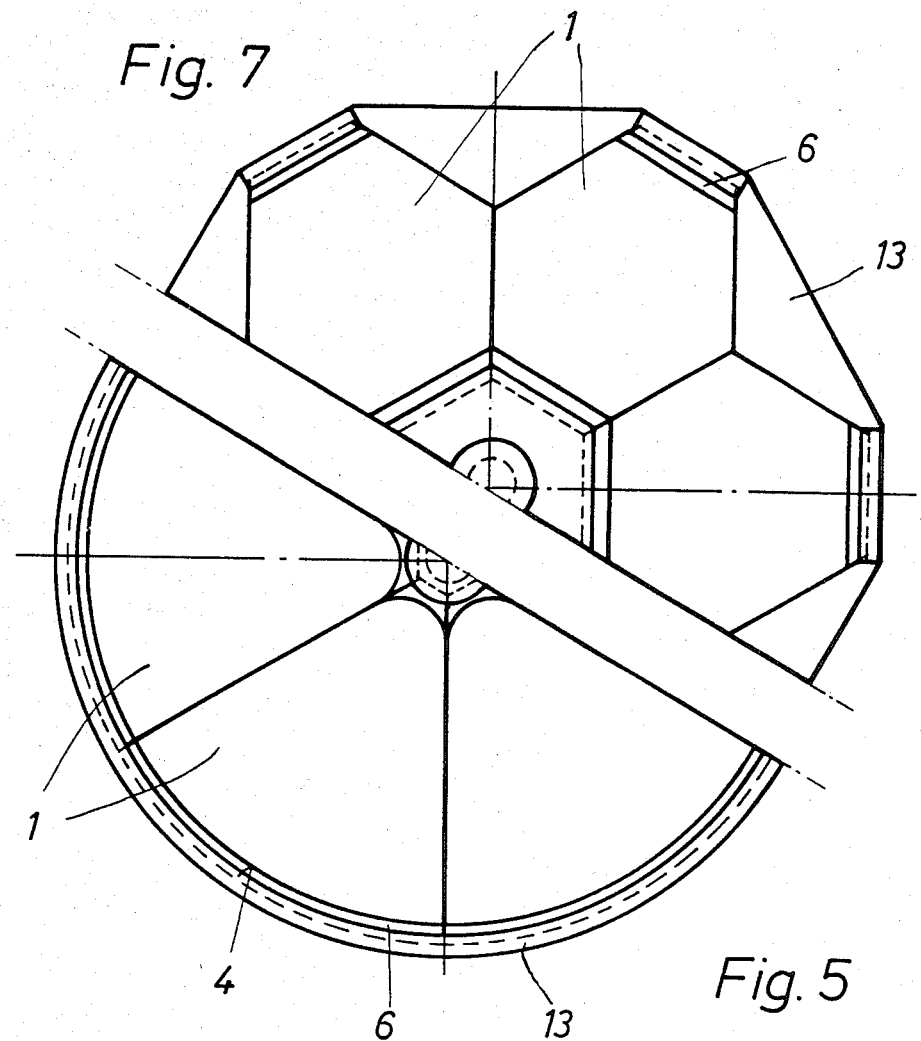
Fig. 7
Fig. 5
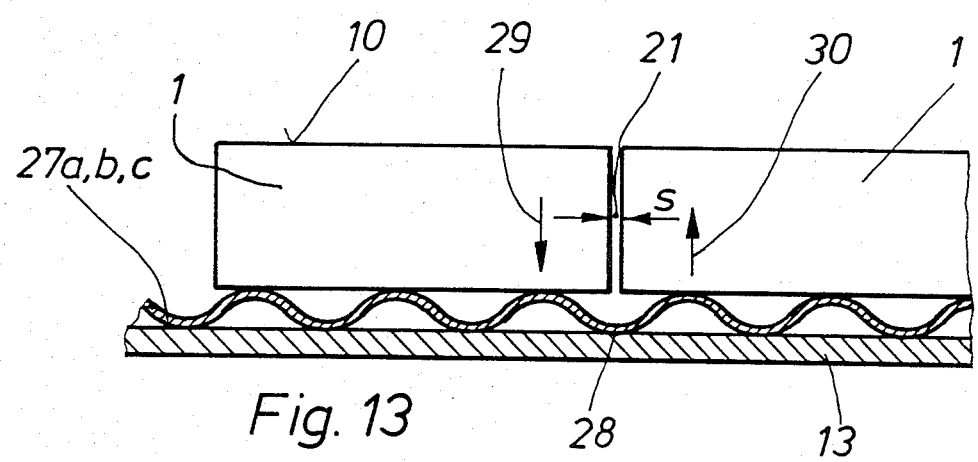
Fig. 13

CARRIER FOR BRAKE LININGS FOR DISK BRAKES HAVING DIVIDED LINING ELEMENTS

The present invention relates to a brake lining carrier for disk brakes having divided lining elements, more particularly, to the mounting and supporting of the brake lining elements on the brake lining carrier.

Rail vehicles have been provided with disk brakes having divided lining elements in which a carrier for brake linings comprises a base plate on one side of which is a friction brake lining and the other side may be detachably mounted or connected to a brake lining support member. The friction lining is subdivided into a plurality of individual brake lining elements which are resiliently mounted on the base plate and vertically with respect to the friction surface. Brake lining carriers of this type are known from the German Pat. Nos. 1 575 773 and 1 575 774.

In both of the above-mentioned German patents, the friction linings are trapezoidal shaped when viewed in plan and are of two different sizes. At a relatively great distance from each other, the friction linings are mounted upon a carrier plate which is common to at least several and preferably all of the friction linings. The carrier plate may be comprised or a woven mat or of a corrugated sheet metal which is positioned upon a correspondingly corrugated surface of the base plate so that the carrier plate is elastically deformable vertically with respect to the friction surface. Each carrier plate is mounted at its ends and in the space between individual friction linings by bolts mounted in the base plate so that the carrier plate may be deformed correspondingly in a resilient manner. While these brake lining carriers permit the resiliently mounted friction linings to conform to any uneven points on the brake disk, the numerous and relatively large spaces between the individual brake linings and the relatively large sizes of the linings cause the carriers for the linings to have a relatively small friction lining value which is important with respect to the maximum operating time of the brake lining carrier. In addition, in spite of their resilient mounting, the individual friction linings which are separate from each other may vibrate or cause the brake disk to vibrate which in turn results in penetrating, screaming noises.

Disk brakes of rail vehicles have also been provided with carriers having a long groove or slot with a dovetail cross section in which is received a correspondingly shaped projection on the back of a brake lining. Such a carrier is shown in DE-OS 25 47 530.

It is therefore the principal object of the present invention to provide a novel and improved brake lining carrier for disk brakes, particularly for rail vehicles, having divided lining elements.

It is another object of the present invention to provide such a brake lining carrier which provides a large friction surface relative to the brake lining carrier with a correspondingly low surface pressure during braking as well as a large brake lining volume which is subject to wear in order to obtain long operating periods.

It is a further object of the present invention to provide such a brake lining carrier in which during braking the individual brake lining elements are capable of movement with respect to the base plate but are mutually supported against each other.

It is an additional object of the present invention to provide such a brake lining carrier wherein the mounting of the carrier can be accomplished in a relatively simple operation but the mounting has a high fatigue limit in order to permit long operating periods.

It is still another object of the present invention to provide such a brake lining carrier wherein the brake lining elements are resiliently mounted but can be uniformly applied during braking in order to avoid local overstressing and overheating of the friction lining as well as the brake disk.

It is still an additional object of the present invention that the brake lining carrier can be adapted for use with the brake carriers of disk brakes for rail vehicles which are presently in use.

The objects of the present invention are achieved and the disadvantage of the prior art are avoided by providing a brake lining carrier with a base plate which has a frame around its edge portion and the friction lining elements that form a friction lining block and mounted on the base plate within the frame so that the individual brake lining elements have a play or clearance which is parallel to the friction surface. Further, the individual brake lining elements are so positioned that in the direction of the effect of friction forces occurring during braking the brake lining elements, while mutually supporting each other, are in contact against each other and can be jointly supported against the frame.

According to one aspect of the present invention, a brake lining carrier for disk brakes, particularly for rail vehicles, having divided lining elements may comprise a base plate one side of which may be detachably mounted on a brake lining support member and the other side is provided with a frame around its edge portion. The plurality of brake lining elements are mounted on the base plate within the frame to form a friction braking surface. The brake lining elements are so mounted so as to have a lateral play parallel to the friction braking surface and in the direction of friction forces occurring on the friction surface during braking, the brake lining elements can be positioned against each other and can be supported jointly against said frame while mutually supporting each other.

Other objects and advantages of the present invention will be apparent upon reference to the accompanying description when taken in conjunction with the following drawings, which are exemplary, wherein;

FIG. 5 is a plan view of ½ of a brake lining carrier according to the present invention but showing a modification in the shape of the brake lining elements;

FIG. 7 is a half of a plan view of still a further modification of a brake lining carrier showing differently shaped brake lining elements;

FIG. 13 shows diagramatically a lateral view of two brake lining elements positioned on a portion of an intermediate resilient layer according to FIG. 11.

Proceeding next to the drawings, wherein like reference symbols indicate the same parts throughout the various views a specific embodiment and modification of the present invention will be described in detail.

Figure 1:
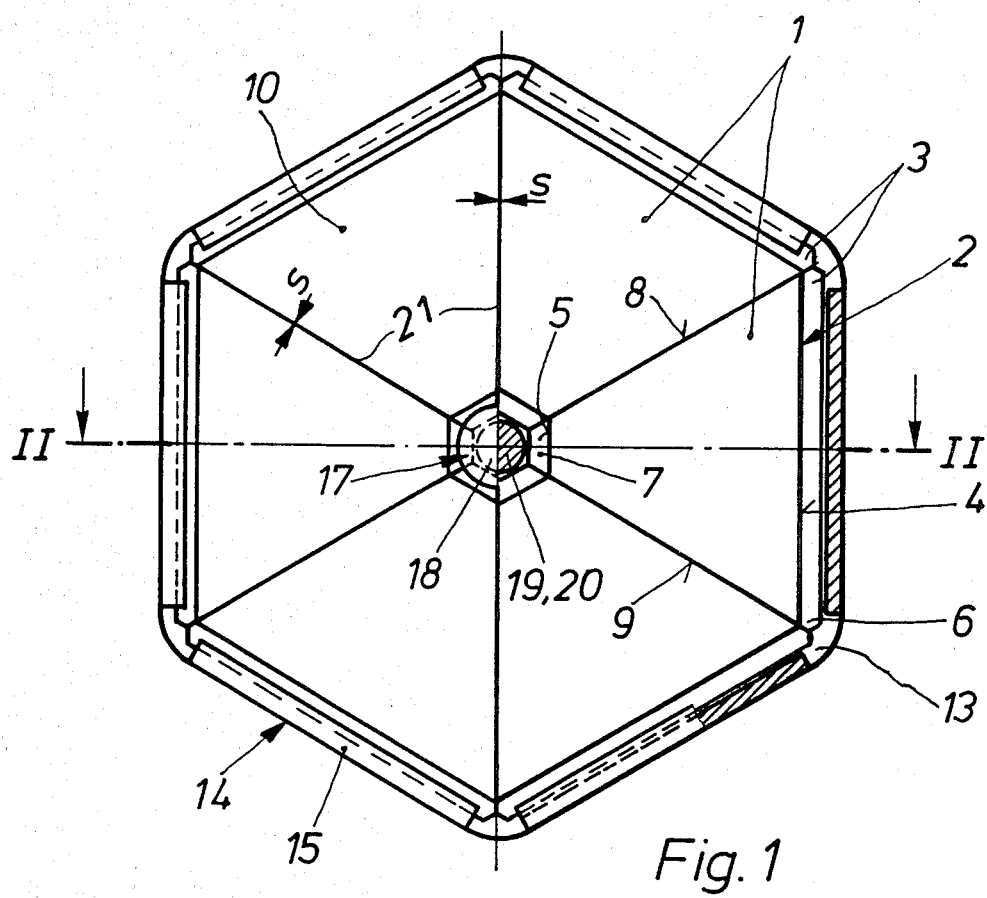
FIG. 1 is a plan view of a brake lining carrier according to the present invention.
Figure 2:
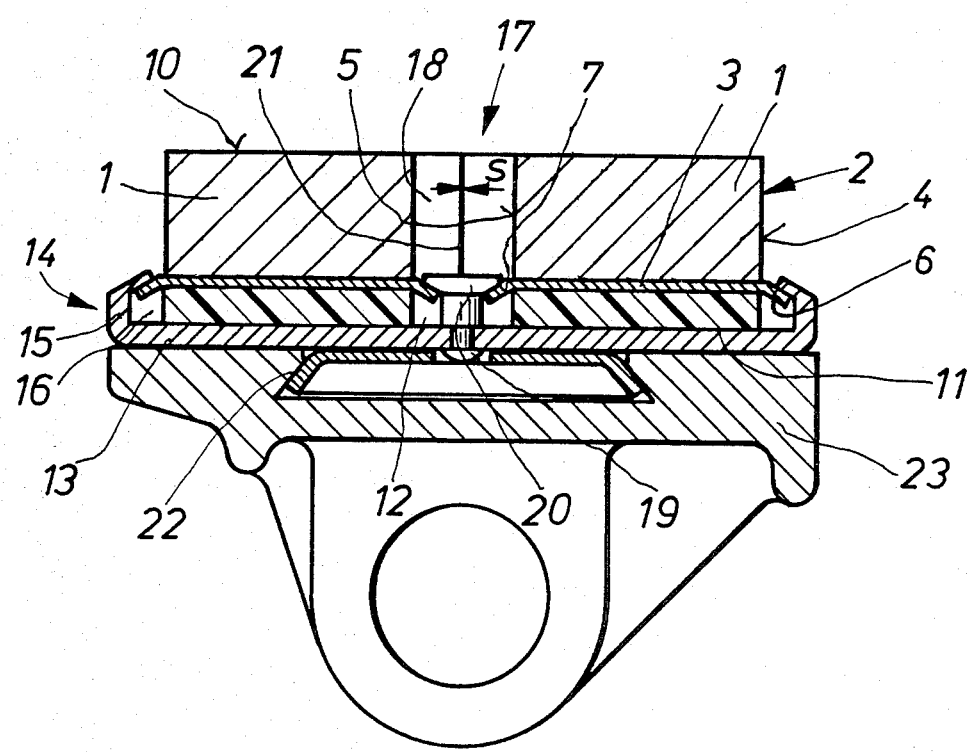
FIG. 2 is a section taken along the line II—II of FIG. 1.

As may be seen in FIG. 1, six individual friction or brake lining elements 1 have in plan view the shape of an equilateral triangle with cut-away angles or ends 5 and are positioned in substantially the shape of a circle to form a hexagonal friction lining block 2. Each brake lining element 1 has its back or undersurface bonded or otherwise firmly attached to a carrier plate 3 as shown in FIG. 2. Each brake lining element 1 has an outer longitudinal side 4 and an inner longitudinal side 5, as defined by the cut-away corner, and opposed from the outer longitudinal side 4. The carrier plate 3 has a flange portion 6 which projects outwardly of the brake element longitudinal side 4 and a flange portion 7 which projects beyond the inner longitudinal side or cut-away corner 5. Each friction lining element 1 has two other lateral sides 8 and 9 with respect to which the carrier plate is flush. The upper surfaces of the brake lining elements 1, are those surfaces facing away from the carrier plates 3, together forming a friction braking surface 10.

As may be seen in FIG. 2, the projecting flanges 6 and 7 of the carrier plates 3 are slightly bent away from the friction braking surface 10. The carrier plates 3 having the brake lining elements 1 mounted thereon are positioned upon a layer of resilient material which, in the plan view, corresponds in shape to that of the friction lining block 2. The intermediate resilient layer 11 may be made of an elastomeric material but may be also formed as a woven mat similar to that disclosed in the above-mentioned German Pat. No. 1 575 773. The intermediate resilient layer 11 is provided with a central recess 12 and is mounted upon a base plate 13 which, in the plan view, has substantially the shape of the friction lining block 2.

The edge portion of the base plate 13 has a frame 14 thereon which comprises essentially a retaining edge 15 of the base plate 13 and this edge 15 is bent in the direction of the friction surface 10 to form a retaining groove 16. The bent flanges of the brake lining elements 1 are thus received within the correspondingly shaped groove 16 as shown in FIG. 2.

The frame 14 may be continuous about the entire periphery of the base plate 13. However, as shown in FIG. 1, the frame may also be formed in an interrupted manner such that individual frame sections are located only along the straight outer longitudinal side 4 of the friction lining block 2.

As a result of the cut-away angles 5 of the individual brake lining box 1, the friction lining block 2 will have in its central area or portion 17 a small opening or recess 18 into which the flanges 7 of the carrier plates 3 project but do not completely fill out the cross sectional area of the opening 18.

A connecting bolt or rivet 19 is secured, such as by riveting, in the base plate 13 so as to project into the central opening 18 and is provided with a projecting or flange-like top portion 20 which overlaps the inwardly projecting flanges 7 of the carrier plates 3. The carrier plates 3 are thus mounted under an initial stress or pretensioning because of the compression of the resilient layer 11 and are mounted or restrained at the frame 14 and at the central link 19 in such a manner that the brake lining elements 1 have a predetermined lateral clearance or play s as viewed in the plane of FIG. 1. The individual brake lining elements 1 that are assembled together to form the friction lining block 2 thus contact and rest against each other along all of their sides which face each other.

On the side of the base plate 13 which faces away from the brake lining elements 1 there is attached an elongated dove-tailed-shaped projection 22 which can be introduced into a correspondingly shaped dove-tailed guide, slot or groove of a brake lining support member 23 and secured therein in a known manner. The brake lining support member 23 is of a known construction and by way of example may correspond to that in the above-mentioned DE-OS 25 47 530.

During a braking operation, the brake lining support member and the components mounted thereon which constitute a brake shoe are moved in a direction to press the friction braking surface 10 against a rotating brake disk which is to be braked. Any possible uneven or projecting areas on the brake disk or on individual brake lining elements 1 are compensated by a corresponding compression of the resilient intermediate layer 11 so that a uniform contact and uniform contact pressure will occur over the entire area of the braking surface 10. The individual brake lining elements 1 which may have nonuniform and differing wear conditions may also adjust themselves on the resilient intermediate layer 11 in such a manner as to not interfere with a uniform contact pressure on the brake disk. The friction forces produced on the friction surface 10 as result of the braking forces will attempt to carry along the individual brake lining elements 1. The brake lining elements 1 will be therefore compressed from the direction of rotation of the brake disk or from the direction in which friction forces are produced on the friction surface 10. As a result, the brake lining elements 11 may no longer be in contact with the base plate 13 or its frame 14 on the side from which the friction forces originate and, while the brake lining elements 1 are still engaged in the base plate 13 they are separated from the base plate. At the same time, the respective lateral side walls 21 of the individual brake lining elements 1 are pressed together by a force which corresponds to the friction force and therefore to the braking force.

The brake lining element or elements 1 on the exiting side of the braking forces will be forced against that portion of the frame 14 and through the frame 14 will transfer the friction forces to the base plate 13 which is mounted upon the brake lining support member 23. The pressing together of the lateral side faces 21 has the effect that the individual brake lining elements 1 on the carrier plates 3 can only be moved with respect to each other under considerable friction which thus changes any vibrations occurring in the individual brake lining elements 1 or the friction bearing block 2 as a whole into friction work and therefore significantly reduces any vibrations. As a result, squealing of the brake disks is virtually eliminated with such a construction.

In order to mount or assemble the brake lining carrier, the intermediate resilient layer 11 is positioned upon the base plate 13 and the individual brake lining elements 1 may be then easily pushed into the frame 14 before the connecting pin 19 is secure. The brake lining elements 1 are then assembled as desired to form the brake lining block 2 and the pin 19 is then inserted and connected to the base plate 13 to complete the assembly operation.

Figure 3:
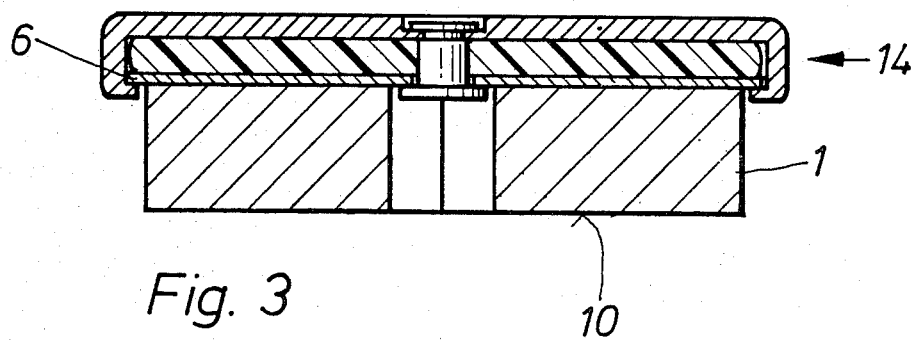
FIG. 3 is a view similar to a portion of FIG. 2 but showing a modification of the frame.
Figure 4:
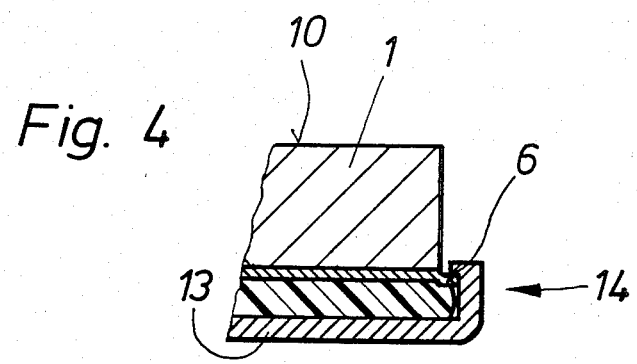
FIG. 4 is a partial view of FIG. 3 but showing a further modification of the frame.

The interacting retaining projecting flanges 6 and the frame 14 may be modified as shown, for example, in FIG. 3 and FIG. 4. In FIG. 3, the projecting flange 6 extends straight out or in the same plane as the carrier plate 3 and the frame 14 is provided with a corresponding shape. This modification which is somewhat simpler in construction has the effect, however, that the individual brake lining elements 1 cannot be subjected to wear to the extent that is possible in the construction of FIG. 2 in which the frame 14 is disposed at a greater distance from the friction braking surface 10.

The modification of FIG. 4 again permits a greater wear and thus a long operating life of the brake lining elements 1 since the retaining flange 6 in the direction of the base plate 13 is recessed and the frame 14 therefore again is disposed at a greater distance perpendicularly from the friction braking surface 10. The retaining flanges 7 on the inner longitudinal sides may also be shaped correspondingly so as to produce corresponding degrees of wear in the area of the connecting pins 19.

As may be seen in FIG. 5, the brake lining elements 1 have their outer longitudinal sides 4 curved with a radius curvature corresponding to substantially the radius of the friction lining block consisting of the assembled brake lining elements 1. The result is a friction lining block that is circular when viewed in plan. The retaining projecting flanges 6 of the carrier plates 3 must therefore be shaped accordingly and the base plate 13 is therefore constructed as a circular plate with an annular frame. The annular frame around the edge portion of the base plate 13 is preferably continuous in form. The remaining components of the brake lining carrier conform to the corresponding components described above and therefore need not be described in greater detail.

The above-described embodiments and modifications of the brake lining carrier may not only be constructed for use in conventional brake lining support members having a dove-tailed guide groove but may also be used in divided lining disk brakes wherein the brake linings rotate about a shaft passing through the friction center of the linings and extending perpendicularly to the friction braking surface 10.

Figure 6:
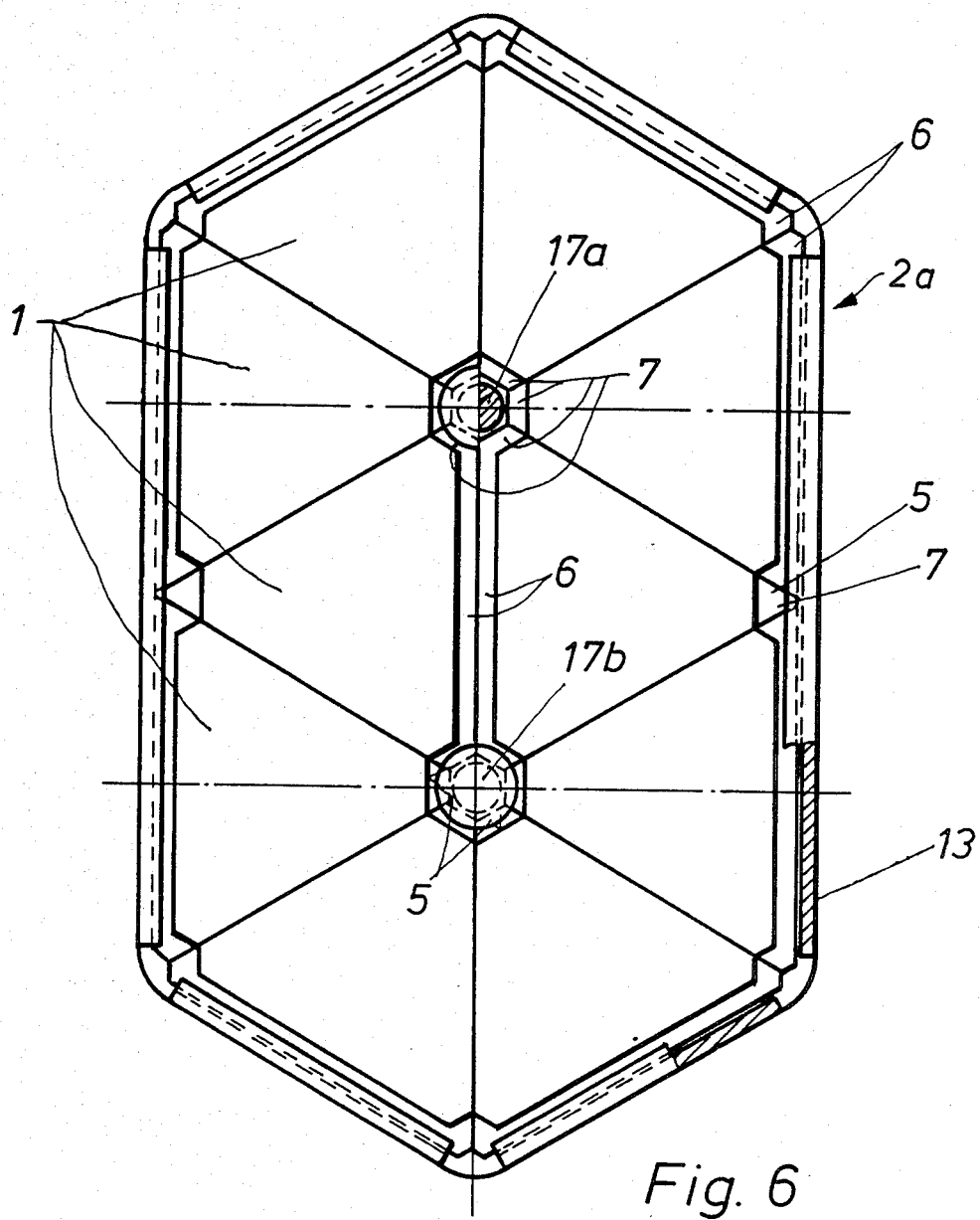
FIG. 6 is a plan view of a further modification of a brake lining carrier according to the present invention with the brake lining elements mounted in position.

In FIG. 6 there is disclosed a brake lining carrier which is particularly suitable for use with a brake lining support member 23 as shown in FIG. 2. In FIG. 6 the friction lining block 2a consists of 10 individual brake lining elements 1 as disclosed in FIGS. 1 and 2 and arranged in two groups of four elements each in such a manner that the inner projecting flanges 7 are directed to central areas 17a or 17b. The two groups of 4 brake lining elements each are opposite or spaced from each other and between these two groups the two remaining brake lining elements 1 are positioned with their cutaway angles 5 directed outwardly of the friction lining block 2a. The carrier for the brake lining elements is thus provided with a substantially oval shape with two central areas 17a and 17b and is in each of these central areas by means of a connecting link (not illustrated in FIG. 6) mounted on the base plate 13 which in turn has a shape that corresponds to the friction lining block 2a.

The shapes of the individual brake lining elements can thus be modified according to particular requirements. As may be seen in FIG. 7, the brake lining elements 1 may be hexagonal in plan view and are assembled to form a substantially circular friction lining block. The brake lining elements 1 are also provided on their outer and inner longitudinal sides with retaining flanges 6 or 7 and are assembled in a frame of the correspondingly shaped base plate 13 by means of a centrally positioned connecting pin attached to the base plate 13.

In each of the above-described embodiments and modifications, completely homogenously developed brake lining elements 1 are assembled to form friction lining blocks 2 or 2a. However, it is also possible to utilize different shaped brake lining elements in a single friction lining block.

Figure 8:
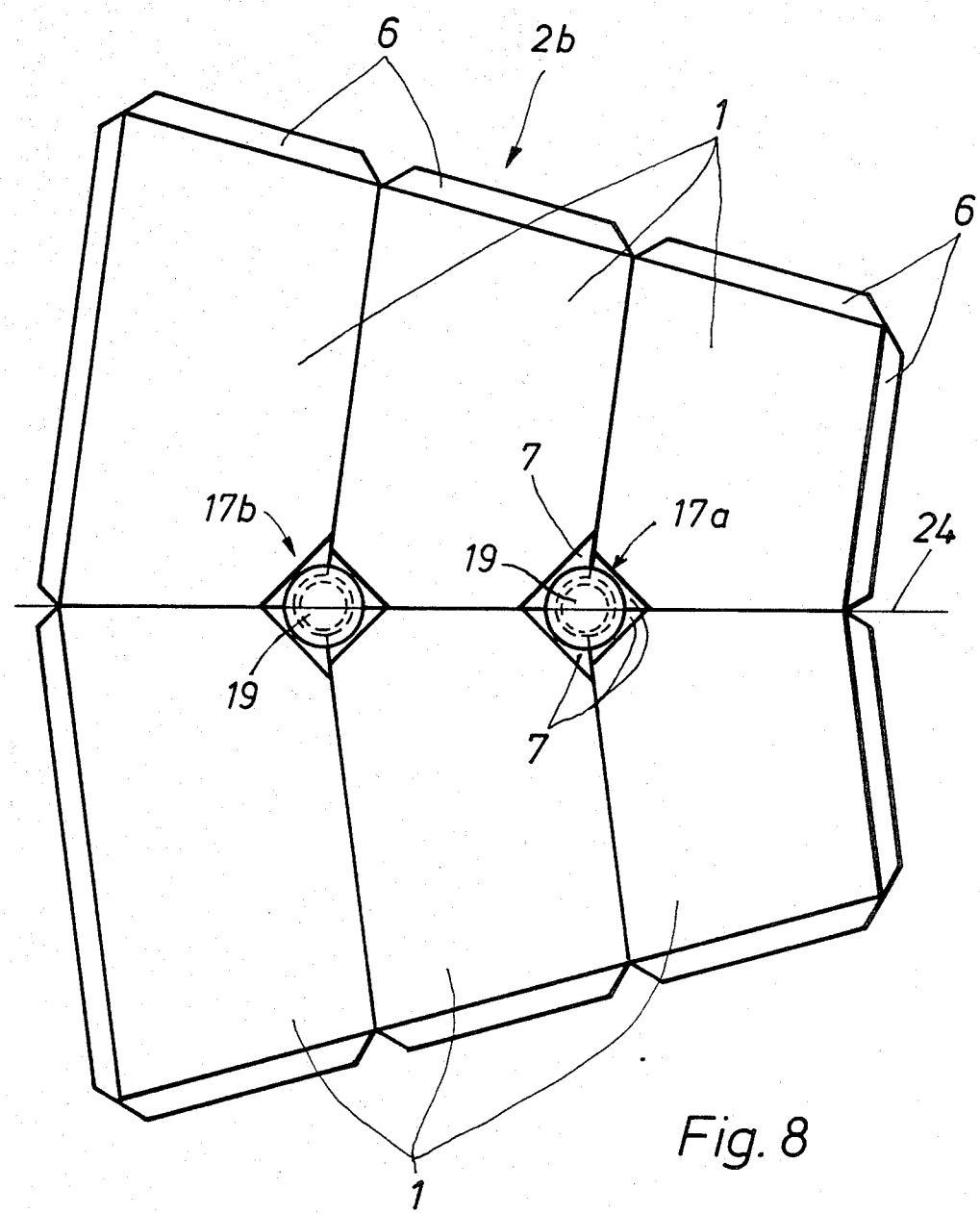
FIG. 8 is a plan view of still another modification of a friction lining block according to the present invention.

In FIG. 8 there is illustrated friction lining block 2b comprised of six brake lining elements 1, each of which has a substantially trapezoidal shape, and these brake lining elements are assembled to form the friction lining block 2b in such a manner that in a plan view the block 2b has a shape substantially that of a segment of a circular area. Relative to the brake disk that is not illustrated, the brake lining elements 1 increase in size radially from the inside to the outside, but in the circumferential direction adjoining brake lining elements have the same size and shape but are provided with modified retaining edge structures with respect to a mean radius 24. In the friction lining block 2b with respect to the radial direction of the brake disk there are provided brake lining elements 1 of three different sizes and in the circumferential direction, two brake lining elements of the same size are positioned adjacent to each other to form a total of six brake lining elements 1. In the structure of FIG. 8, the retaining flanges 6 are so arranged that they are located on the outer edges or sides of the brake lining elements 1. However, at the two central areas 17a and 17b where the corners of four brake lining elements meet, these corners are cut away and the projecting retaining flanges 7 are located at these cut-away corners. Connecting pins 19 are mounted in the central areas 17a and 17b and are fastened to the base plate in the manner as described above with their top or projecting heads extending over the retaining flanges 7. The remaining structure of the brake lining carrier according to FIG. 8 corresponds to the above-described structure and need not be described in any further detail.

Figure 10:
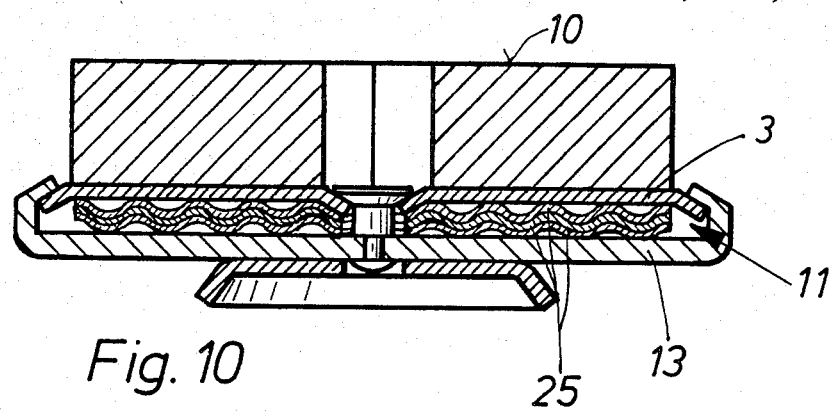
FIG. 10 is a transverse sectional view of a brake lining carrier and friction block according to FIG. 9.
Figure 9:
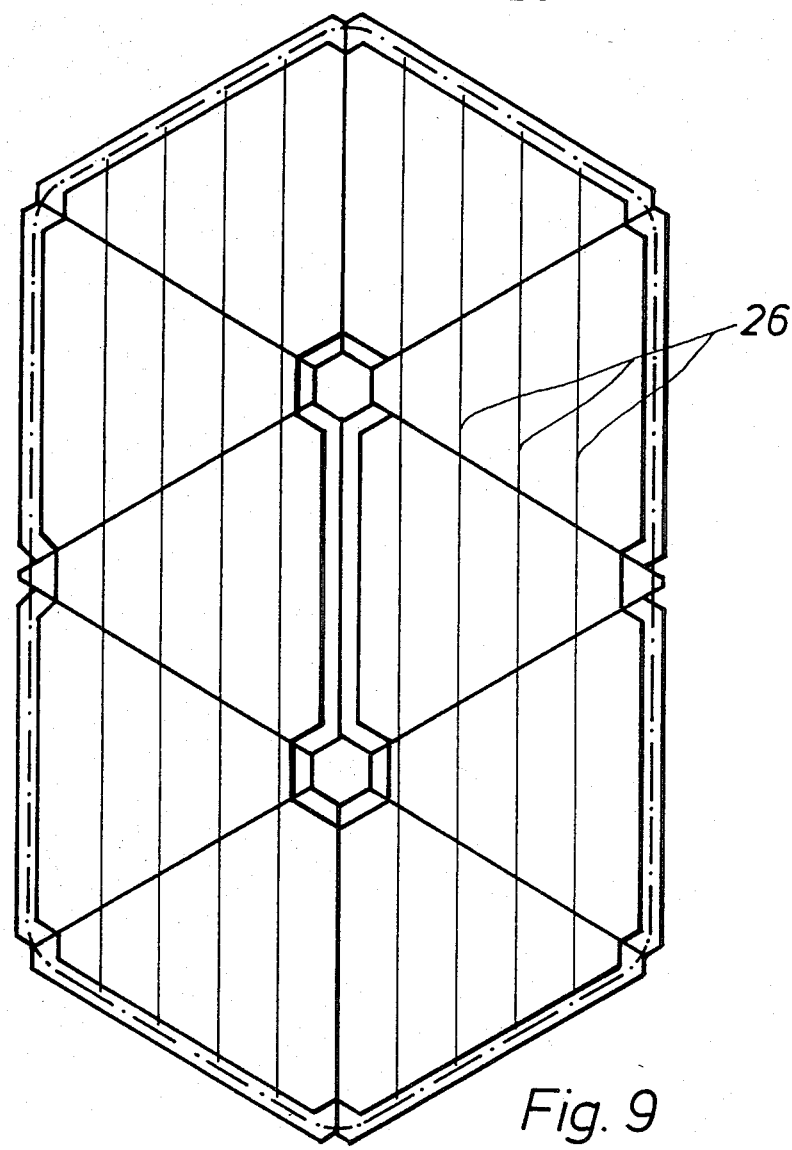
FIG. 9 is a plan view of the underside of the friction lining block of FIG. 6 having a resilient intermediate layer positioned thereagainst.

The layer of resilient material 11 may also comprise one or more layers of corrugated sheet metal as shown in FIGS. 9 and 10. In FIG. 10, several layers 25 of corrugated sheet metal are used as the intermediate layer 11 between the carrier plate 3 and the base plate 13. The layers 25 are identical and the corrugation of each layer nest and engage each other in the manner as illustrated. The individual layers 25 are preferably made of a spring steel. In FIG. 9 which illustrates a friction lining block corresponding to that of FIG. 6, the axes of the corrugations of the layers 25 are indicated by lines 26. The intermediate layer 11 constructed in this manner provides a high degree of damping in a direction perpendicular with respect to the friction braking surface 10 because when the layers 25 are compressed the individual layers exert strong frictional forces with respect to each other. This provides a further damping of movement and vibration of brake linings in the carrier. In addition, the layers 25 may be provided with friction-increasing surfaces or high friction surfaces made of a suitable material may be inserted between the individual layers 25 which again increases the damping effect.

Figure 11:
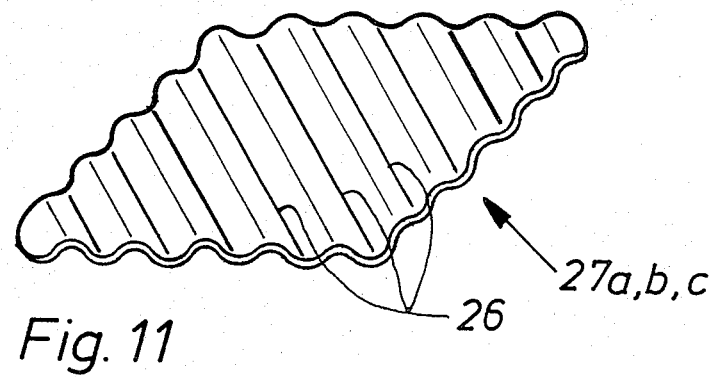
FIG. 11 is a perspective view of a segment of a corrugated metal sheet utilized as a resilient layer.
Figure 12:
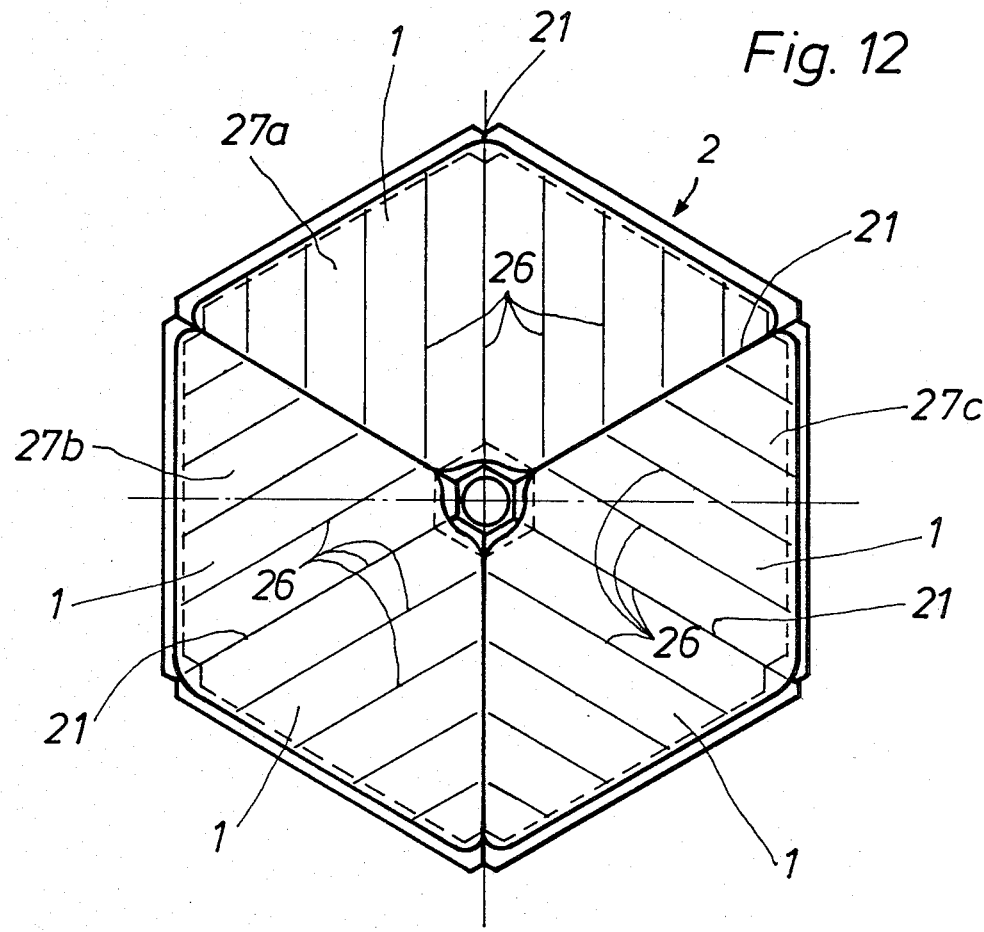
FIG. 12 is a plan view of a friction lining block as shown in FIG. 1 but with portions of the intermediate resilient layer according to FIG. 11.

An advantageous construction of the intermediate layer 11 when formed of a plurality of layers 25 of corrugated sheet metal comprises the intermediate layers subdivided into individual sections each of which has the shape of two adjacent and contacting brake lining elements 1. Such a construction is shown in FIG. 12 wherein a friction lining block 2 according to FIG. 1 is composed of three sections 27a, 27b and 27c with each section having the shape of a rhomboid. FIG. 11 illustrates one of these individual sections with the lines 26 showing the axis of the corrugations. The sections 27a, 27b and 27c are completely identical. Each section can have the same construction as disclosed in FIG. 10 which comprises several individual layers of corrugated sheets of spring steel.

In FIG. 12, the axes of corrugation 26 extend parallel to the contacting lateral surfaces 21 of two adjacent brake lining elements 1 such that each pair of brake lining elements is supported by a single section 21a, b or c. As shown in FIG. 13, the corrugation is so constructed that in the plane extending in the contacting lateral faces 21 the sections 27a, 27b and 27c with their corrugation rest directly upon the base plate 13 as illustrated at point 28 in FIG. 13. As result of this positioning of the corrugation, when the brake lining element 1 at the left is pressed downwardly in the direction of the arrow 27, the adjacent brake lining element 1 on the right is subjected to an increased upward force in the direction of the arrow 30. Thus, should there be any roughness or nonuniformity in either the friction braking surfaces or the brake disk, the opposite movements of the left and right brake elements 1 shown in FIG. 13 result in providing a uniform or flush surface over the entire friction braking surface 10, thus avoiding so-called "hot spots" in the friction zone between the brake lining carrier and the brake disk.

A similar effect compensates for surface pressures in the friction surface during braking and the intermediate layer 11 is made of an elastomer material. In this situation also an increased pressing down of one brake lining element 1 will cause an increased support or lifting of the adjacent brake lining element.

A dry powdered metal is preferably used as the friction material for the brake lining elements 1. The assembly of the brake lining elements to form the brake lining blocks 2, 2a or 2b will counteract any crumbling of the dried powder metal along the adjacent and contacting lateral sides 21.

Thus it can be seen that the present invention has provided a brake lining carrier wherein a plurality of brake lining elements are securely mounted on a carrier plate but in such a manner that the individual brake lining elements are capable of limited lateral movement as result of friction forces exerted thereon during the braking operation. The construction for mounting the brake lining elements is simple but reliable and is capable of providing brake shoes susceptible of long periods of operation with a minimum of maintenance. The brake lining elements are resiliently mounted so that individual elements are capable of adjusting vertically to compensate for unevenness, for nonuniformity in the co-acting friction surfaces of the brake shoe and the brake disk.

It will be understood that this invention is susceptible to modifications to adapt it to different usages and conditions and, accordingly, it is desired to comprehend such modifications within this invention as may fall within the scope of the appended claims.

What is claimed is:

1. A brake lining carrier for disc brakes having divided lining elements, particularly for rail vehicles, comprising a base plate having one side detachably mountable on a brake lining support member and a second side, means on the edge portion of said second side of said base plate for defining a frame having a perimeter, said frame having a lip bent away from said edge portion to define a groove, a plurality of brake lining elements disposed laterally on said second side of said base plate and within said frame to define a friction lining block having a friction braking surface, each of said brake lining elements being fixed upon a carrier plate having projecting flange portions on at least two longitudinal sides of the brake lining element and substantially flush on remaining sides of the brake lining element, most of the adjacent brake lining elements being in contact with each other along their respective lateral sides, said frame perimeter enclosing the friction lining block defined by said plurality of mounted brake lining elements, said friction lining block having an open central portion, a layer of resilient material interposed between said friction lining block and said base plate, the projecting flange portions on the outer longitudinal sides of said brake lining elements being received within said groove, the projecting flange portions on the inner longitudinal sides of said brake lining elements extending into said open central portion, clamping means disposed in the open central portion of said friction lining block for exerting a force perpendicular to said friction surface against said flange portion extending into the open central portion to retain said flange portions, said brake lining elements within said frame having a lateral play parallel to said friction braking surface such that in the direction of friction force occurring on the friction surface during braking, the brake lining elements can be positioned against each other and can be supported jointly against said frame while mutually supporting each other.

2. A braking lining carrier as claimed in claim 1 wherein substantially all of said brake lining elements have the same shape, each of said brake lining elements has the shape of substantially an equilateral triangle and one angle thereof being cut off to define one of said longitudinal sides, one of said carrier plate projecting flange portions being at said cut-off angle and the other at the side opposed therefrom.

3. A brake lining carrier as claimed in claim 2 wherein six brake lining elements are disposed to define a substantially circular friction lining block in which said one carrier plate projecting flange portions are directed to the center of said friction lining block.

4. A brake lining carrier as claimed in claim 3 wherein the other longitudinal sides are shaped to correspond substantially to the radius of said friction lining block.

5. A brake lining carrier as claimed in claim 2 wherein at least ten of said brake lining elements are disposed to define a substantially oval friction lining block, a first four of said brake lining elements positioned such that their said one carrier plate projecting flange portions on said cut-off angle are directed to a first center and a second four of said brake lining elements positioned such that their said one carrier plate projecting flange portions are directed to a second center, said first and second fours of brake lining elements positioned adjacent to each other and at least two additional brake lining elements are positioned between said first and second fours but with their other carrier plate projecting flange portions facing each other.

6. A brake lining carrier as claimed in claim 1 wherein said brake lining elements are each substantially hexagonal in shape.

7. A brake lining carrier as claimed in claim 1 wherein said brake lining elements are each substantially trapezoidal in shape and a corner on said inner longitudinal side thereof being cut-away, at least four of said brake lining elements are disposed such that said cut-away corners are directed to a center portion.

8. A brake lining carrier as claimed in claim 1 wherein said one side of said base plate has thereon a dovetail shaped projection receivable in a correspondingly shaped groove in a brake lining support member.

9. A brake lining carrier as claimed in claim 1 wherein said layer of resilient material comprises at least one corrugated metal sheet.

10. A brake lining carrier as claimed in claim 2 wherein said layer of resilient material comprises at least one corrugated metal sheet, said corrugated metal sheet comprising a plurality of segments and each segment interposed between two adjacent brake lining elements and said base plate, the corrugations of each segment extending parallel to contacting lateral sides of said two adjacent brake lining elements.

* * * * *